United States Patent [19]

Wright

[11] Patent Number: 4,960,550
[45] Date of Patent: Oct. 2, 1990

[54] ENCAPSULATION METHOD FOR HOT ISOSTATIC PRESSING

[75] Inventor: Joseph M. Wright, Santa Ana, Calif.

[73] Assignee: Ford Aerospace Corporation, Newport Beach, Calif.

[21] Appl. No.: 382,865

[22] Filed: Jul. 20, 1989

[51] Int. Cl.$^5$ ............................................. C04B 35/64
[52] U.S. Cl. ...................................... 264/56; 264/62; 264/332
[58] Field of Search ........................... 264/56, 62, 332

[56] References Cited

U.S. PATENT DOCUMENTS

| | | |
|---|---|---|
| 4,081,272 | 3/1978 | Adlerborn . |
| 4,455,275 | 6/1984 | Alderborn et al. . |
| 4,462,816 | 7/1984 | Wolfe et al. . |
| 4,495,123 | 1/1985 | Hunold ............................... 264/332 |
| 4,722,825 | 2/1988 | Goldstein . |

FOREIGN PATENT DOCUMENTS 5435806  8/1977  Japan .

Primary Examiner—James Derrington
Attorney, Agent, or Firm—Harry G. Weissenberger; Edward J. Radlo; Keith L. Zerschling

[57] ABSTRACT

The encapsulation of ceramic preforms (10) for HIP processing is considerably simplified, and the use of standard laboratory glassware as encapsulation material is made possible, by placing non-sealed glass capsule parts (12, 14) around the preform (10) in the HIP pressure vessel (18), evacuating the vessel (18), heating the vessel (18) to a temperature at which the glass parts (12, 14) fuse together but do not collapse, and then pressurizing the vessel (18) and increasing the temperature therein as required for conventional HIP processing.

8 Claims, 3 Drawing Sheets

ENCAPSULATION METHOD FOR HOT ISOSTATIC PRESSING

FIELD OF THE INVENTION

This invention relates to encapsulation techniques for the hot isostatic pressing of ceramic objects, and more particularly to a selfsealing encapsulation technique.

BACKGROUND OF THE INVENTION

In the manufacturing of certain ceramic objects, higher density and improved properties may be achieved when a low density preform of the object is consolidated by hot isostatic pressing (HIP) processing. For some ceramic materials to be processed this way requires that the object be hermetically encapsulated. This encapsulation prevents the gas used during HIP processing from infiltrating the preform and defeating consolidation. A simple shaped object is placed in a glass enclosure, the enclosure is evacuated, and sealed to provide the encapsulation prior to processing in the pressure vessel. In the course of the HIP process, the glass enclosure softens and collapses into close contact with the preform. The resulting soft glass forms a hermetic membrane that allows densifying pressure to be applied to the surface of the preform for consolidation.

The disadvantages of the standard procedure are that the enclosures have to be specially formed to the approximate shape of the preform, sealed around the preform, and then evacuated through a nipple that is sealed when the evacuation is complete. At best, this procedure requires the purchase of specially formed glass parts and sealing machinery, and at worst, it requires the services of a glass blower for each individual preform.

Representative prior art proposed by Adlerborn in U.S. Pat. No. 4,081,272 describes a technique in which a preformed ceramic shape embedded in quartz powder is evacuated and sealed inside a glass capsule prior to isostatic processing.

Besides the aforementioned Adlerborn U.S. Pat. No. 4,081,272, the prior art in the field includes: Adlerborn U.S. Pat. No. 4,455,272 which describes the processing of a preform encapsulated in an evacuated glass capsule; Wolfe et al U.S. Pat. No. 4,462,816 which teaches collapsing an open glass tube around several spaced preforms in a vacuum, and cutting the collapsed tube into individual encapsulations to process; Goldstein U.S. Pat. No. 4,722,825 in which a ceramic-lined metal tube is produced by sintering a metal/ceramic preform in an evacuated glass capsule under atmospheric pressure; and Kobe Steel Japanese Pat. No. 54-35806 which shows isostatic processing; in a sealed but unevacuated metal or glass container, of a metal or ceramic capable of absorbing the residual $O_2$ and $N_2$ in the container.

DISCLOSURE OF THE INVENTION

The present invention simplifies the isostatic processing of ceramic preforms by eliminating the glass powder and the required evacuating and sealing described by the above-cited Adlerborn reference. The simplified process and the ability to use inexpensive glassware for encapsulation described in this invention is a clear advantage for isostatic processing of ceramic shapes.

The invention resides in the realization that the encapsulation of the preform (10) can be greatly simplified by placing the preform (10) in a glass container consisting of mating but unsealed parts (12, 14), heating the container (12, 14) in a vacuum in the isostatic press (18) until the mating parts (12, 14) seal against each other, and then applying the requisite heat and pressure to collapse the container (12, 14) against the preform (10) and carry out the desired HIP processing of the preform (10).

The process of this invention makes possible the use of inexpensive sodium borosilicate glassware in the HIP processing of ceramic preforms (10), and dispenses with the need for sealing and evacuating glass capsules prior to placement in the press (18), as well as the cooling and handling of the capsules between evacuation and HIP processing.

DESCRIPTION OF THE PREFERRED EMBODIMENT

Figure 2:
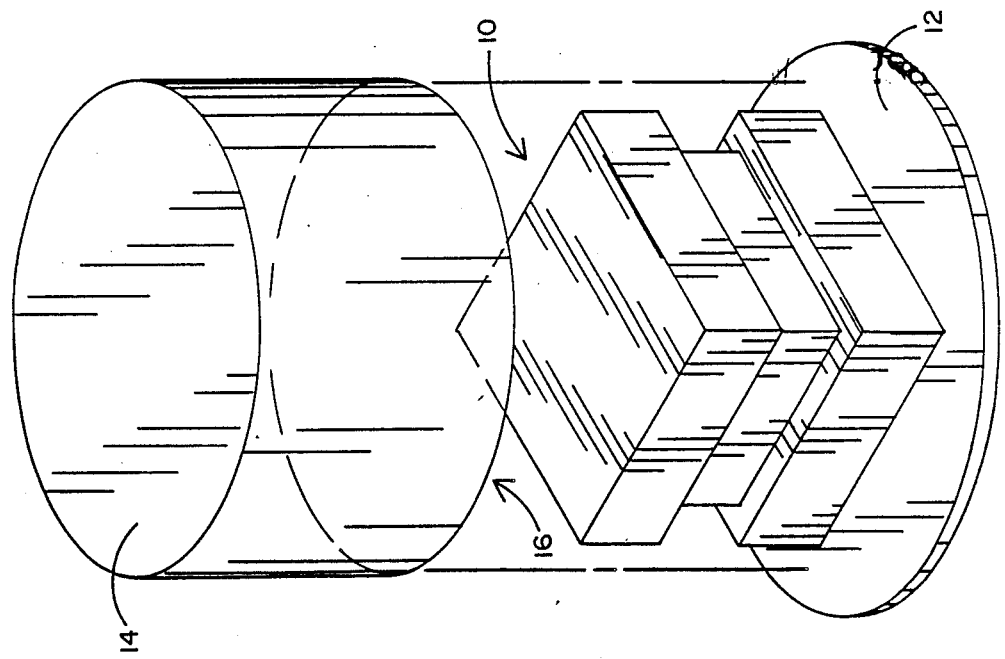
FIG. 2 is a perspective view showing the preform being placed in a mating glass container.
Figure 1:
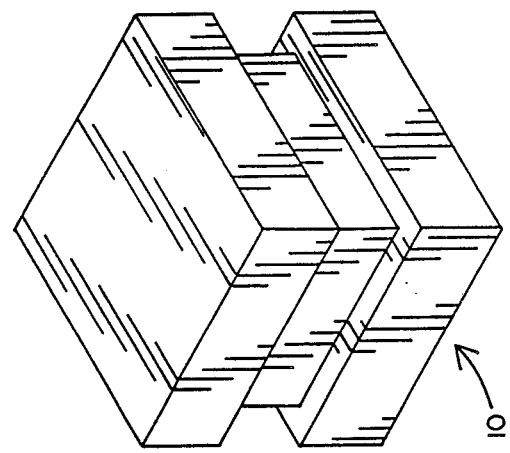
FIG. 1 is a perspective view of a ceramic preform to be densified.

A ceramic preform 10, which may, for example, have the shape of FIG. 1, is placed on a plate 12 of sodium borosilicate glass such as Pyrex or Kimax, and a close-fitting (preferably within 1.5 cm) inverted beaker 14 of the same material is placed over it (FIG. 2). The rim 16 of the beaker 14 is, at this time, in loose, non-airtight contact with the plate 12. Whatever the shape of beaker 14, it must of course contact plate 12 along a continuous closed line such as the circular rim 16 of FIG. 2.

Figure 4:
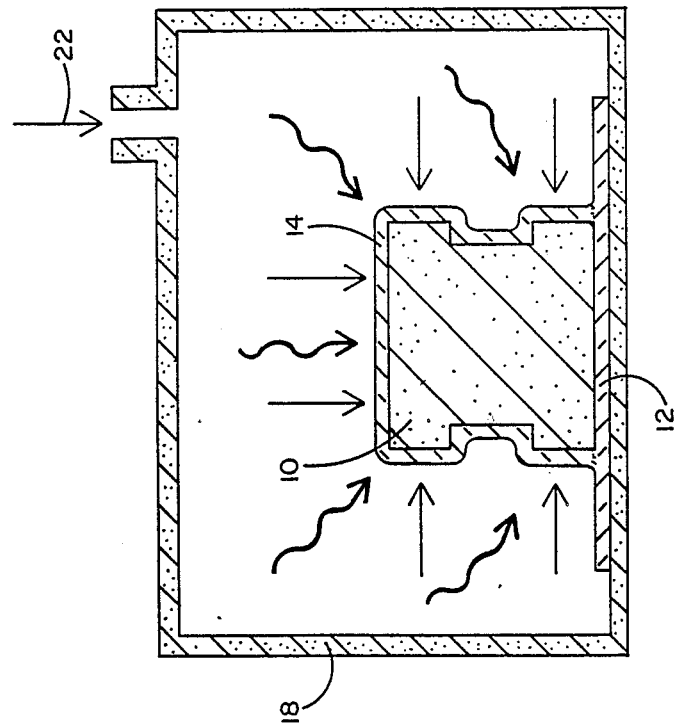
FIG. 4 is a vertical section similar to FIG. 3 but showing the preform and container after HIP processing.
Figure 3:
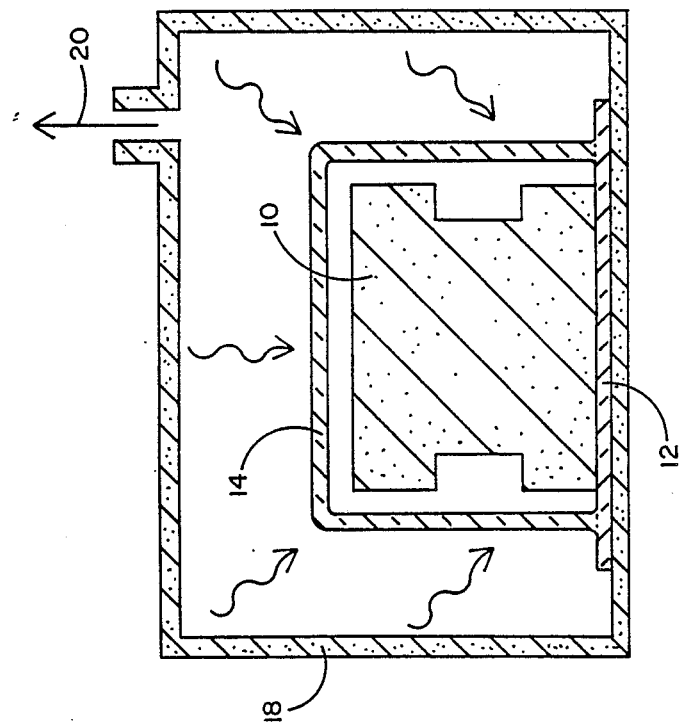
FIG. 3 is a vertical section of the preform and container after the vacuum heating step of the invention but before HIP processing.

The preform 10, plate 12, and beaker 14 are now placed in the HIP pressure vessel 18 (FIG. 3), and a vacuum is drawn as indicated by arrow 20. Heat (indicated by wavy arrows in FIGS. 3 and 4) is now applied until the glass plate 12 and beaker 14 soften sufficiently for the rim 16 to sealingly bond against the plate 12. With sodium borosilicate glass, this occurs at about 850° C.; or if high-silica glass such as 96% silica glass is used, the bonding temperature is about 1,450° C.

The bonding temperature and vacuum in the vessel 18 are held for about 15 minutes to assure a good seal. A suitable inert gas is then introduced into the pressure vessel 18 (arrow 22 in FIG. 4), and the vessel temperature is increased, until in accordance with conventional HIP technology, the combination of isostatic pressure (straight arrows in FIG. 4) and heat causes the glass beaker 14 to collapse tightly against the preform 10 and densify it.

After cooling, the glass encapsulation is destroyed, in accordance with conventional HIP methodology, to expose the finished densified preform.

Figure 5A:
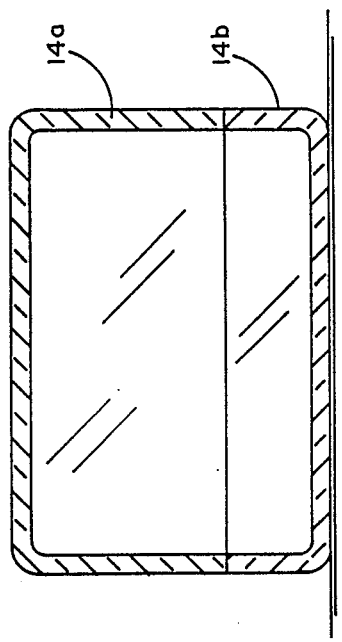
FIGS. 5a–d are vertical sections of various possible container configurations.
Figure 5B:
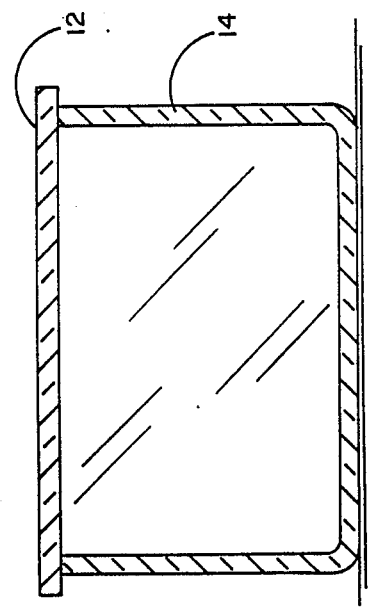
Figure 5C:
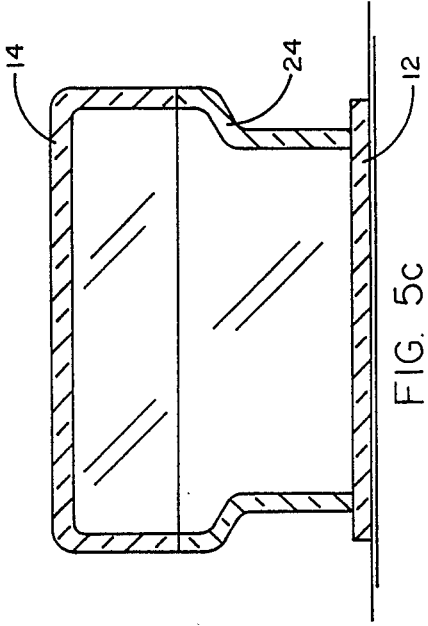
Figure 5D:
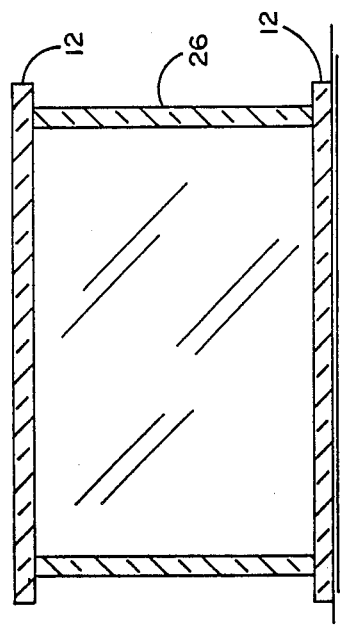

FIGS. 5a through 5c illustrate, as a matter of example, various forms of glass containers which may be used in the invention. FIG. 5a shows a double beaker 14a, 14b; FIG. 5b shows that the plate 12 may be placed on top of the beaker 14 rather than underneath it; and FIG. 5c illustrates the use of more than two container parts, including, if desired, non-standard parts such as 24; and FIG. 5d shows a tube 26 closed at its top and bottom ends by dual plates 12. This permits greater size flexibility by using standard tubes of circular, square or rectangular cross section.

In view of this disclosure, many modifications of this invention will be apparent to those skilled in the art. For example, other glasses than those herein described can be used. It is intended that all such modifications which fall within the scope of this invention be included within the terms of the appended claims.

I claim:

1. A method for the hot isostatic pressing of a ceramic preform, comprising the steps of:
    (a) providing a container including at least two glass parts adapted to contact each other along a continuous closed line when placed around said preform;
    (b) placing said parts in non-airtight contact with each other about said preform in a heatable pressure vessel;
    (c) drawing a vacuum in said pressure vessel;
    (d) heating said evacuated pressure vessel to a temperature at which said parts sealingly bond to one another along said line but do not collapse against said preform;
    (e) pressurizing said vessel after said parts have bonded together; and
    (f) applying sufficient additional heat and pressure to collapse said glass parts against the surface of said preform.

2. The method of claim 1, in which said glass is sodium borosilicate glass and said bonding temperature is substantially 850° C.

3. The method of claim 1, in which said glass is 96% silica glass and said bonding temperature is substantially 1,450° C.

4. The method of claim 1, in which said bonding temperature is maintained substantially level between said vacuum heating step and said pressurizing step.

5. The method of claim 4, in which said bonding temperature is maintained for substantially 15 minutes.

6. The method of claim 1, in which said glass parts are standard laboratory glassware.

7. The method of claim 6, in which said parts are a plate and a beaker.

8. The method of claim 6, in which said parts are a pair of plates closing off the ends of a tube.

* * * * *